June 30, 1931.    M. O. JENSEN    1,812,152
MANOMETER GAUGE
Filed May 11, 1929    2 Sheets-Sheet 2
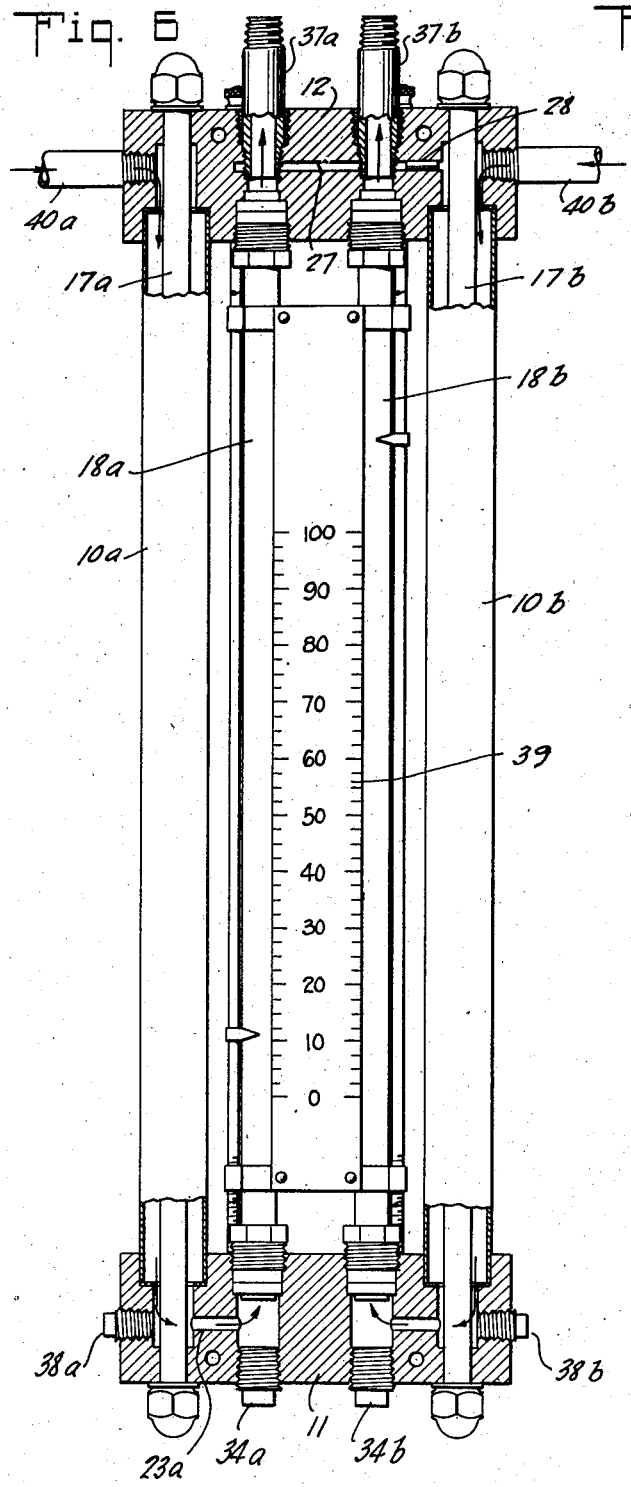
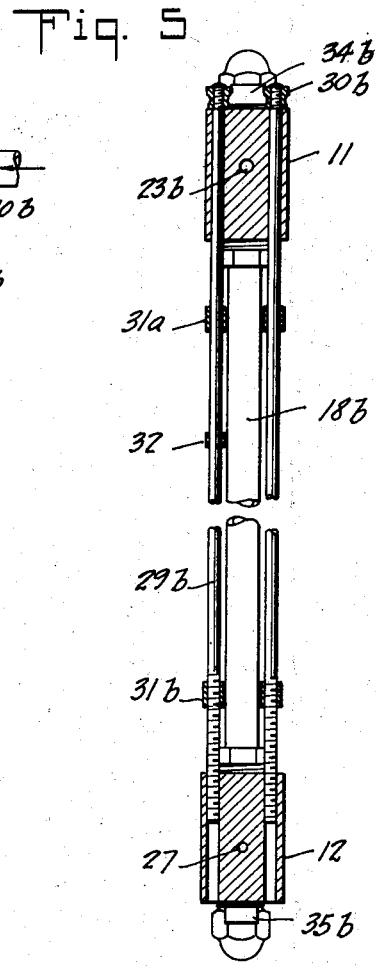
INVENTOR.
Milton O. Jensen
BY Westall and Wallace
ATTORNEYS.

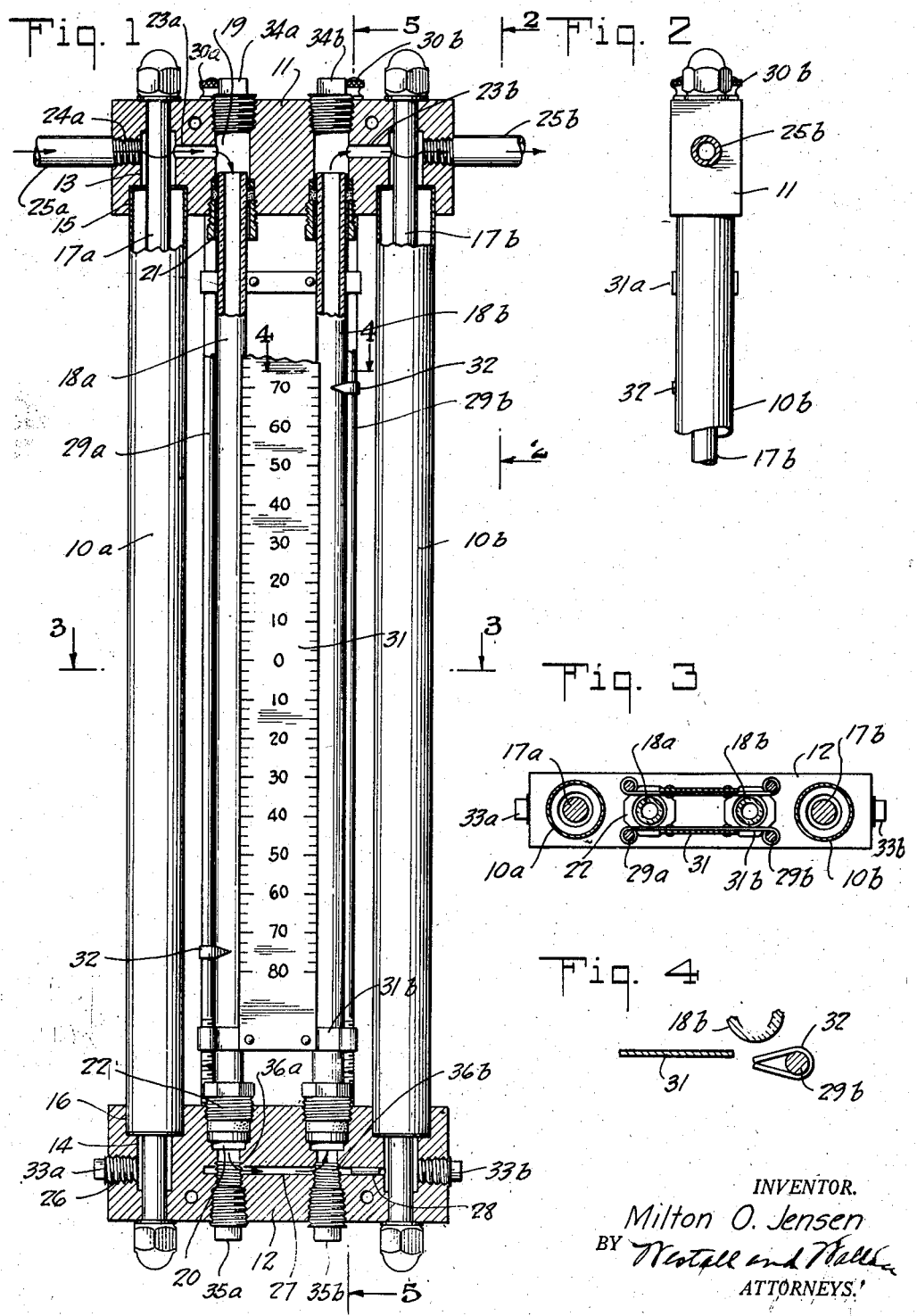

Patented June 30, 1931

1,812,152

UNITED STATES PATENT OFFICE

MILTON O. JENSEN, OF HUNTINGTON PARK, CALIFORNIA

MANOMETER GAUGE

Application filed May 11, 1929. Serial No. 362,236.

This invention relates to a gauge of the manometer type for indicating differences in pressures, or what is commonly termed a U gauge. Such gauges are commonly employed to indicate differences in pressure in flow lines. However, there are a variety of uses to which the gauge may be put.

It is desirable to have a gauge with tubes of transparent material forming sight gauge limbs. Such limbs are commonly made of glass, which is fragile and subject to breakage. The present invention contemplates a frame of non-fragile material, such as metal and arranged to shield the fragile limbs or manometer tubes. At times, a sudden fluctuation of pressures may occur sufficient to blow the indicating fluid from the manometer limbs. The invention also contemplates a frame having stiles which may serve as traps for the indicating fluid in the event that the latter is blown from the limbs. Furthermore, it is desirable under certain conditions to provide two manometers side by side to indicate comparative or correlated differences in pressures. The invention includes as a feature, a structure of the character described wherein the frame has end rails with passages so arranged that the stiles may be connected to the manometer tubes either to function as traps or as cooperating manometer limbs. Another feature of the invention resides in the provision of a frame of the character described, easy and economical of manufacture and assembly, durable, compact and strong.

These objects together with other objects and corresponding accomplishments are obtained by means of the embodiment of my invention illustrated in the accompanying drawings, in which:—

Fig. 1 is a front elevation of a gauge with the end blocks or rails in section and parts broken away, the passages being arranged to cause the intermediate manometer tubes to function as a single manometer, and the stiles as traps for actuating fluid; Fig. 2 is a side elevation as seen looking in the direction of the arrows 2 of Fig. 1, showing a fragment of the gauge; Figs. 3, 4 and 5 are sections as seen on the lines correspondingly numbered in Fig. 1; and Fig. 6 is a front elevation partly in section of the gauge showing the passages in the end rails arranged to cause the stiles to function as manometer limbs and to provide two manometers.

Referring more particularly to Figs. 1 to 5 inclusive, the frame comprises side stiles 10a and 10b. These stiles are preferably metallic tubes with their ends seated in rails 11 and 12. The end rails are preferably blocks of metal and have formed therein bores in alinement with the tubes 10a and 10b. Each bore for stile 10a has a reduced portion indicated respectively by 13 and 14 and enlarged portions indicated respectively by 15 and 16. The enlarged portions of the bores are counter bored so as to form recesses for the tube 10a to seat in the end rails. Similar bores are formed in the end rails for tube 10b. Tie bolts 17a and 17b extend through the bores and tubes thereby providing for convenience in manufacture and assembly of the frame and associated part.

Intermediate the stiles 10a and 10b are glass tubes 18a and 18b forming manometer limbs. The end rails are formed with bores 19 and 20 for manometer limb 18a and like bores are formed for manometer limb 18b. Suitable shoulders are provided in the bores and threads for packing glands 21 and 22 so as to form leak tight fits for the limbs. The bores are tapped at their outer ends. The bores for manometer limb 18a has a connection passage 23a communicating with the portion 13 of the bore for stile 10a. A tapped opening 24a in rail 11 constituting the outer end of connection passage 23a, communicates with the bore for the stile and is adapted to receive a service pipe or tube 25a. In end rail 12 is a tapped bore 26. Tapped bores of a like nature are provided for stile 10b and manometer tube 18b. In end rail 12 is a junction passage 27 connecting the bores for manometer limbs 18a and 18b. For convenience in manufacture, the junction passage 27 is formed by drilling a hole through the rail 12 extending to bore 20 and sealing the outer end by a plug 28.

Extending between and rotatably mounted in the end rails is a pair of rods 29a and 29b and having heads 30a and 30b whereby they may be rotated. A similar pair of rods is provided on the other side of the tubes 18a and 18b. Mounted on brackets 31a and 31b is a scale 31 for taking readings of the actuated or indicating fluid in the manometer limbs. A like scale is similarly supported on the other pair of rods. These scales may be marked with characters arranged in any suitable manner. Bracket 31a is slidably mounted on the rods and bracket 31b is threaded thereon. By turning the rods the scales may be raised or lowered to adjust their zero position. On the rods are pointers 32 encompassing the rods and slidably mounted thereon so that the pointers may be moved to any desired position and serving to conveniently mark any division on the scale. Two scales may be provided, one on each side for convenience in taking the readings.

It will be noticed that, as shown in Fig. 1, plugs 33a and 33b close the openings in end rail 12 corresponding to the openings in end rail 11 which are shown connected to pipes 25a and 25b. The manometer bores in end rail 11 are closed by plugs 34a and 34b. The corresponding bores in end rail 12 are closed by plugs 35a and 35b. It will also be noticed that the reduced portions of the manometer bores in end rail 12 are threaded as indicated by 36a and 36b.

The passages in the end rails are so arranged in Fig. 1, that pipe 25a may be connected to one source of pressure to be measured and pipe 25b to the other. Indicating fluid is placed in manometer limbs 18a and 18b, and the glass limbs function in the usual manner of a manometer. If the indicating fluid is blown out of a manometer limb, it will encounter either a tie bolt 17a or 17b which acts as a baffle, and will drop into the corresponding stile 10a or 10b, where it may be finally recovered by removing either plug 33a or 33b.

Referring to Fig. 6, the gauge is shown inverted and with passages in the end rails so arranged that there are two manometer gauges, each gauge employing one of the stiles as a limb. Plugs 35a and 35b are removed from rail 12 and pipe nipples 37a and 37b substituted, the pipe nipples closing communication of the manometer limb bores through junction passage 27. It will be noted that the pipe nipples are threaded into the tapped portions 36a and 36b of the bores, and either pipe nipple would serve to close the junction passage. In end rail 11 plugs 38a and 38b replace pipe 25a and 25b. The plugs may merely be shifted. A different scale or set of scales indicated by 39 will be substituted, as the heights of the columns of indicating fluid in the manometer limbs 18a and 18b are only visible. It will be noted that manometer tube 18a and stile 10a form limbs of one manometer to which connection is made to the sources of pressure to be measured by pipe 40a and nipple 37a. Similarly, the other manometer comprises limbs 10b and 18b to which connection is made by pipe 40b and nipple 37b. Thus two manometers side by side are provided.

What I claim is:—

1. A gauge of the character described comprising a frame including side stiles formed of non-fragile material, end rails formed of non-fragile material, and a pair of manometer limbs disposed intermediate said stiles and extending between said rails: said stiles being tubular, said end rails being blocks and one having connection passages communicating with the manometer limbs and having outer ends adapted to be sealed or to be connected to a source of pressure to be measured, the other of said rails having a junction passage therein connecting the manometer limbs, and said other rail having bores communicating with said manometer limbs and adapted to be sealed or to be connected to a source of pressure to be measured.

2. A gauge of the character described comprising a frame including hollow side stiles adapted to form manometer limbs, end rails, and a pair of manometer tubes forming manometer limbs disposed intermediate said stiles; said end rails being blocks and one having connection passages communicating with the manometer tubes and each connection passage having an outer end adapted to be sealed or to be connected to a source of pressure to be measured, each of said passages crossing and communicating with the bore of stile; the other of said rails having a junction passage therein connecting the manometer tubes, and said other rail having bores communicating with said manometer limbs and adapted to be sealed or to be connected to a source of pressure to be measured.

3. A gauge of the character described comprising a frame including side stiles, end rails, and a pair of manometer limbs disposed intermediate said stiles and extending between said rails: said stiles being tubular, said end rails being blocks and one having connection passages communicating with each manometer limb and each having an outer end adapted to be sealed or to be connected to a source of pressure to be measured, each of said passages crossing and communicating with the bore of a stile, the other of said rails having a junction passage therein connecting the manometer limbs, said other rail having bores communicating with said manometer limbs and adapted to be sealed or to be connected to a source of pressure to be measured, the first mentioned rail having bores, one for each manometer limb communicating with a corresponding connection passage.

In witness that I claim the foregoing I have hereunto subscribed my name this 27th day of April, 1929.

MILTON O. JENSEN.